Figure 1:
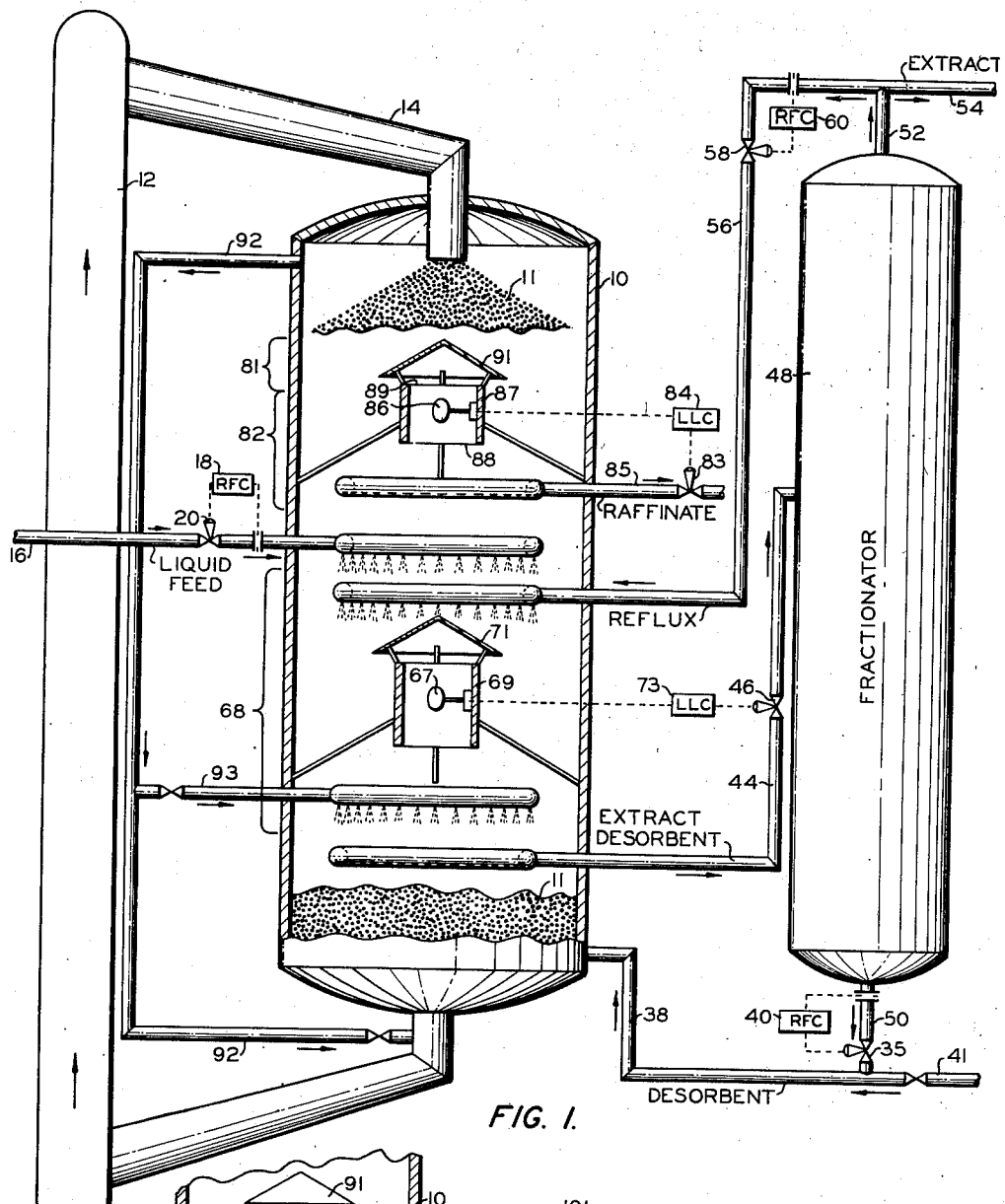

Oct. 23, 1956 R. A. FINDLAY 2,768,221
ADSORPTION-DESORPTION PROCESS
Filed Dec. 8, 1950

INVENTOR.
R. A. FINDLAY
BY Hudson & Young
ATTORNEYS

United States Patent Office
2,768,221
Patented Oct. 23, 1956

2,768,221

ADSORPTION-DESORPTION PROCESS

Robert A. Findlay, Bartlesville, Okla., assignor to Phillips Petroleum Company, a corporation of Delaware Application December 8, 1950, Serial No. 199,890

16 Claims. (Cl. 260—674)

This invention relates to the separation of organic mixtures into constituents by selective adsorption. In one of its more specific aspects this invention relates to the recovery of fractions of differing chemical characteristics and differing adsorbability by the use of a single downwardly moving bed of solid adsorbent particles. In certain embodiments this invention pertains to the separation of aromatic hydrocarbon fractions from hydrocarbon oils.

It has long been known to contact a liquid mixture of organic materials with solid adsorbents, usually silica gel or activated charcoal, although many other adsorbents such as activated alumina, bauxite, magnesia, etc. may be used, whereby the more readily adsorbed component or components are taken up by the solid and the less readily adsorbed component or components remain unadsorbed. In this manner a separation may be obtained between components of a two component mixture, or a complex mixture may be separated into two fractions of different characteristics according to adsorbability. By repeated treatment, three or more fractions of different character may be separated. Several methods of recovering the adsorbed material from the solid are available, including the use of a different liquid for which the solid adsorbent has more affinity than the organic material which it has adsorbed, the use of a different liquid for which the solid adsorbent has less affinity than the organic material which it has adsorbed, and removal of the adsorbed material by vaporization from the adsorbent. Thus, a hydrocarbon mixture containing paraffins and aromatics may be contacted in the liquid phase with silica gel, for example, under conditions at which the paraffins are unadsorbed and the aromatic material is adsorbed. The paraffinic material is physically separated as one product from the gel, and the latter is then treated by one of the methods mentioned to remove the aromatic material which is thus recovered as the other product.

Lately this basic process which has long been used by batch procedures has been developed into a continuous process in which the silica gel or other solid adsorbent in the form of powder or small granules is passed downwardly in "rod-like" flow in the form of a compact bed or columnar mass in contact with a hydrocarbon or other liquid material being treated. In any such continuous process the liquid feed is introduced at an intermediate or low point in the column of gel and the unadsorbed so-called raffinate is withdrawn from the top. The adsorbed material or so-called extract is then separated from the gel. The separation of the extract from the gel can be carried out in a separate column although it is generally advantageous both with respect to equipment requirements and life of the solid adsorbent agent to carry out the separation of extract from the solid adsorbent by contacting same with a different liquid for which the solid adsorbent has more, or has less, affinity than the extract as described hereinbefore. Such a process has the further advantage that a stream of solid adsorbent materials is withdrawn from the bottom of the adsorption chamber free from extract and wet only with the "different liquid" and elevated to the top of the adsorption column for re-use. In carrying out such a continuous process in this manner, liquid desorbent adhering to the particles of the solid adsorbent which are removed from the bottom and returned to the top of the column is displaced from the gel by nonadsorbed components of the feed, i. e., the raffinate, and is recovered from the top of the column in mixture with the raffinate product. This stream is then of necessity separated by fractional distillation for the recovery of raffinate in desired high purity and for further recovery of the adsorbent for recycle to the bottom of the column.

My invention is concerned with a continuous adsorption process employing a downwardly moving bed of solid adsorbent material of the type described hereinabove, wherein a stream of raffinate of high purity is withdrawn from an upper point of the column simultaneously with the withdrawal of a stream of desorbent liquid in admixture with raffinate, the latter stream being then recycled to the adsorption column. In the practice of my invention raffinate free from desorbent is recovered from the adsorption system without the need for conventional fractionation steps therefor.

An object of my invention is to provide a continuous adsorption process for the fractionation of organic compounds. Another object is to provide a continuous adsorption process for the recovery of chemically unlike components from a mixture of hydrocarbons. Another object is to provide a continuous adsorption process wherein adsorption, desorption, conditioning of the adsorbent for re-use, and separation of raffinate in high purity is conducted in a single column. Another object is to provide an improved method of separating occluded desorbent from a downwardly moving contiguous particulate mass of solid adsorbent material in a continuous adsorption process utilizing a desorbent liquid. Other objects will be apparent to one skilled in the art from the accompanying disclosure and discussion.

In a preferred embodiment of my invention, particles of a solid adsorbent material are passed continuously downward as a moving columnar mass or bed in a vertical elongated column, removed from the bottom thereof and returned to the top to provide continuous operation. Into a point somewhat below the top of the downwardly moving column or bed, often in close proximity to the mid-point, is introduced a liquid feed stream comprising the materials to be separated, composed of at least two components of differing adsorbability. The component more readily adsorbed on the solid adsorbent is adsorbed and carried downwardly while the less readily adsorbed component passes upwardly in the column. Into the bottom of the moving bed is introduced a liquid desorbent which is less readily adsorbed by the solid adsorbent material than the adsorbed components of the feed. The desorbent liquid flows upwardly in the column and in a lower portion of same effects desorption of the more readily adsorbed component of the feed, i. e., the extract. Liquid is withdrawn from a point above the point of introduction of the desorbent but below the point of introduction of the feed in such quantity that desorbent entering the bottom of the column is no permitted to pass upwardly beyond the withdrawal point. The withdrawn liquid is composed of liquid desorbent plus extract which has been desorbed, and is subjected to fractional distillation to separate the extract from the liquid desorbent. A portion of the extract thus recovered is removed as product while the remaining portion, usually major, is returned to the column as "reflux" at a point appreciably above the point of withdrawal of the desorbent-extract stream. The rate of withdrawal of the last mentioned stream is controlled and correlated with the other liquid flow so as to establish an essentially stationary liquid zone between the point of desorbent-extract withdrawal and the point of reflux extract introduction thereabove. The extract material introduced above the stationary liquid zone provides a refluxing action which effects rectification in a portion of the column of adsorbent above the point of introduction of reflux. This reflux extract material as it passes upwardly through the column is re-adsorbed by the downwardly moving adsorbent, thus displacing raffinate from the adsorbent, and by this rectification action provides an extract product of high purity. Solid adsorbent which is passed downwardly through the adsorbent zone, stationary liquid zone, and desorption zone is removed from the bottom of the column, wet with liquid desorbent, and returned to the top of the column, i. e., to an uppermost zone therein. Liquid desorbent associated with the withdrawn solid adsorbent need not be removed as it is innocuous in the top of the column. In the conventional operation of adsorption columns of this type, as described above, the portion of the desorbent thus conveyed to the top of the column is removed therefrom in the raffinate stream, and it then becomes necessary to fractionate the raffinate or otherwise separate raffinate from the desorbent. Desorbent is freed from solid adsorbent in the top of the column by displacement therefrom by the nonadsorbed components of the feed, i. e., raffinate, and as a result a mixture of raffinate and liquid desorbent is formed in an uppermost zone in the adsorption column. However, as provided for by my invention as described hereafter, raffinate, free from liquid desorbent, is maintained in an upper zone of the column subjacent the said uppermost zone to provide a source from which pure raffinate is continuously withdrawn from the column. Simultaneously with the withdrawal of pure raffinate is a withdrawal of a raffinate-desorbent liquid stream from the uppermost portion of the column. The latter stream is preferably recycled to the adsorption column at a point above the point of withdrawal of desorbent-extract and below the point of introduction of reflux. Accordingly, the recycled raffinate-desorbent stream is utilized as a means for washing raffinate free from particles of the solid adsorbent to provide for a higher yield of extract, and for release of the raffinate thus freed for travel up the column, while at the same time desorbent liquid from the recycled stream is withdrawn from the column as a component of the extract-desorbent stream to be separated into desired extract product, and into desorbent of purity for re-use in the adsorption system.

As described herein, a raffinate stream free from desorbent is withdrawn from an upper portion of the adsorption column, no fractionation or other conventional separation means being required for the further purification thereof.

The zones of high purity raffinate and raffinate-desorbent liquid are maintained in the upper column by regulating the flow of high purity raffinate withdrawal from the column. Any desired means for regulating the flow can be utilized, it being important that the flow be so-regulated that there is no appreciable flow of desorbent downwardly through the desorbent-raffinate zone, and preferably so that a flow of raffinate from the high purity raffinate zone upwardly into the desorbent-raffinate zone is maintained at a minimum. Obviously, if the rate of high purity raffinate withdrawal is excessively high, desorbent will flow from the top of the column downwardly through the subjacent raffinate zone and if the rate of raffinate withdrawal is too low raffinate otherwise recoverable in a high state of purity will be caused to pass upwardly through the uppermost zone. Means for regulating the raffinate flow will be specifically described in the following discussion of the drawings.

Desorbent, when recovered from the desorbent-extract stream by fractionation, is withdrawn at an elevated temperature and returned to the adsorption column. The solid adsorbent passing through the lower portion of the adsorption column is cooled, as desired, prior to re-use by circulating a portion of the recycled desorbent-raffinate stream to the adsorption column at a point in the lower portion thereof, below the point of introduction of hot desorbent liquid from the fractionation. If desired, the recycled desorbent-raffinate coolant stream can be added to the solid adsorbent subsequent to discharge of same from the column, but at a point permitting the coolant to rise in the column.

A more detailed understanding of the various aspects of my invention may be obtained from the accompanying drawings and the following descriptions thereof, which serve to exemplify preferred forms of my invention. Figure 1 of the drawings is a schematic showing of apparatus and flow of materials therethrough suitable for practicing the invention as applied to the treatment of a feed material to separate same into two fracions of different adsorbability, for example, the separation of a hydrocarbon mixture containing paraffinic and aromatic constituents into a paraffin-rich fraction and an aromatic-rich fraction. Such a feed material may be obtained, for example, by fractionation of a natural or straight run gasoline to produce a relatively narrow boiling range cut. Naphthenic hydrocarbons may also be present, which are normally obtained in the raffinate, although the adsorption may be carried out to produce a pure paraffinic raffinate and an extract containing both aromatics and naphthenes. This choice is possible because the naphthenes are intermediate the paraffins and aromatics in ease of adsorption. Figure 1 is diagrammatic in character and not drawn to scale. Numerous auxiliary items of equipment in Figure 1 such as valves, pumps, condensers, means for providing reflux and reboilers of fractionators, controls, and the like, are not shown in order to avoid confusion, the supplying of such items being well within the skill of the art having once been given the present disclosure.

Figure 2:
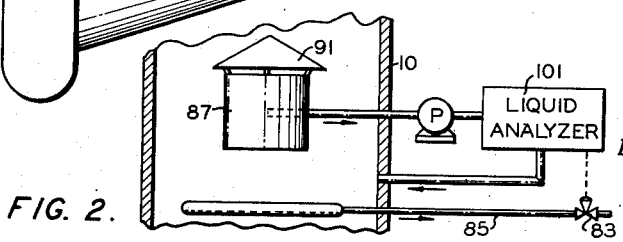

Figure 2 is illustrative of means other than that specifically described with reference to Figure 1 for regulating the flow of raffinate from the adsorption chamber.

It will be appreciated that various modifications can be made, departing from the exact details of the system as shown in the drawings, without departing from the invention.

With reference to Figure 1, reference number 10 represents a vertical elongated closed shell or chamber in which the adsorption and desorption are carried out. A suitable adsorbent, for instance silica gel, is introduced into the top of chamber 10 in the form of fine particles, e. g., particles of 30 to 200 mesh size, and a contiguous particulate mass or bed 11 of the silica gel particles is maintained within chamber 10. This bed is allowed to move downwardly through chamber 10 in rod-like flow by gravity. Gel is removed from the bottom of chamber 10 by any suitable means. In the drawing a housed bucket type elevator 12 is shown adapted to pick up gel directly from the bottom of chamber 10 and carry it upwardly to a point above the top of chamber 10. Any other suitable means for lifting particles may be employed, such as liquid or gas lift. Screw conveyors or other suitable devices can be employed if desired. Silica gel lifted by elevator 12 is discharged into chute 14 and into the top of chamber 10 thus continuing the cyclic movement of the gel through the system. Ordinarily, the elevator is within an enclosed housing as shown connected with the bottom of column 10, and a liquid level of desorbent is maintained in the elevator housing to serve as a liquid seal. The liquid to be separated into fractions, as for example a hydrocarbon fraction comprising aromatics and nonaromatics, is introduced into column 10 via line 16, at a point intermediate the ends of the chamber 10, preferably in close proximity to the middle or somewhat above, and at a controlled rate through motor valve 20 in line 16, maintained by rate of flow controller 18. Gel flows downwardly in the top part of chamber 10 and liquid flows upwardly. In passing upwardly through the descending bed of silica gel, the major portion, and preferably all, of the aromatic content of the feed is adsorbed. The percentage adsorbed depends on the ratio of gel flow rate to aromatics flow rate, temperature of treatment, height of column, character of the feed constituents, character of the adsorbent, concentration of the desorbent and various other factors as will be appreciated by one skilled in the art by virtue of the present disclosure. By way of example, preferred conditions employing when utilizing a silica gel in the adsorption of benzene from a feed comprising a n-paraffin fraction having a boiling range within the limits of 130 and 180° F. and containing from 1 to 8 weight percent benzene, include an adsorption temperature of from 70 to 110° F., desorption with hot desorbent at a temperature above the adsorption temperature, i. e., above 110° F., preferably between about 400 and 500° F., a volume ratio of reflux to fresh feed within the limits of about 2:1 and 10:1, and a recirculation rate of wetted gel containing from 50 to 80 percent of its weight of desorbent, of about 0.2 to 0.5 pound per pound of fresh feed. Under these conditions dearomatized n-hexane and benzene product fractions each of from 80 to 95 percent purity are recovered.

Sufficient liquid desorbent is added at the bottom of the column 10 through line 38 to strip adsorbed aromatics from the gel. Even though the desorbent is less readily adsorbed by the gel than the aromatics, this stripping is possible in view of the fact that adsorption-desorption is an equilibrium operation and an adsorbed liquid, such as an aromatic hydrocarbon, can be desorbed into a paraffinic or cycloparaffinic hydrocarbon liquid which is sufficiently low in its content of aromatic hydrocarbon. The gel, free from the aromatics which have been desorbed, leaves the bottom of column 10 wetter only with desorbent and is elevated to the top of the column for re-use as described. As the desorbent flows upwardly through the lower portion of the mentioned bed of gel in column 10, it becomes enriched in the aromatic components of the feed which it is desorbing from the gel. The resulting liquid is withdrawn from a lower point thereof via line 44 at a rate controlled by motor valve 46, and is passed into fractionator 48 of conventional design. When the liquid desorbent is higher boiling than the extract, it is recovered as bottoms product from fractionator 48 by line 50 and is recycled to the bottom of column 10 through line 38 and motor valve 35, controlled by rate of flow controller 40. Any required make-up desorbent can be introduced into the system through lines 38 and 41. The aromatic portion of the feed which has been absorbed and then recovered by desorption is recovered as the extract product from fractionator 48 via line 52. Part of this material is withdrawn as the net product through line 54 while another part usually larger than the product attained in line 54 is passed through line 56 and motor valve 58 controlled by rate of flow controller 60 back into column 10 as a reflux stream, at a point above the level of withdrawal line 44. The liquid introduced through line 56 passes upwardly through the downwardly moving bed 11 of silica gel and acts as a reflux, displacing from the gel by its own adsorption raffinate material which has been adsorbed and/or occluded by the gel higher in the column. Of course the aromatic-rich extract material passing upwardly as reflux ultimately all becomes adsorbed by the gel and is brought back down and finally recovered through line 44. It will thus be seen that what amounts to an internal cycle of extract material or reflux flows through line 56, column 10, line 44, fractionator 48, and line 52, while through a portion of this circuit, column 10, line 44, and line 52 flows an additional quantity of extract material which enters as part of the feed to line 16 and leaves as the net extract product through line 54. The process is so controlled as to avoid a net liquid flow downwardly between the entry point of line 56 and the exit point of line 44, the net movement of extract material downwardly therethrough being limited to that adsorbed on the gel. This is accomplished in one manner by continuously detecting the specific gravity of a portion of the liquid intermediate the point of introduction of reflux and the point of withdrawal of liquids through line 44. When the relative flow rates of the various liquid streams entering and leaving column 10 are such that an upward flow of liquid occurs through desired stationary zone 68, the specific gravity of the liquid portion being measured changes and the withdrawal of extract-desorbent liquid is altered accordingly to restore the specific gravity of predetermined value. As illustrated, float means 67 is positioned in open end reservoir 69 through which the flow of silica gel is prevented by cover 71. Float 67 is calibrated for a mixture of liquids having a specific gravity within a predetermined range, and is raised or lowered in accordance with the buoyant force exerted thereon, which is a function of the specific gravity of the liquid at such a time. Float 67 is connected with controller 73 so as to actuate same to move valve 46. Float 67 in response to a flow of liquid downwardly through zone 68 is adapted to actuate controller 73 to move valve 46 into a closed position. Similarly float 67 in response to a liquid flowing in an upward direction through zone 68 is adapted to actuate controller 73 to move valve 46 into an open position. The values of specific gravities of the liquids concerned determine the specific operation of float 67, for example, if liquid flowing downwardly through zone 68 is of a higher specific gravity than that of the stationary liquid, float 67 will be buoyed in an upward direction and adapted to actuate controller 73 to close valve 46. If the process were attempted to be operated without the described means, at least part of the reflux introduced through line 56 would flow downwardly through zone 68 as part of the free liquid therein and fail to perform its function of rectification in the upper portion of column 10, or, part of the relatively dilute solution of extract in liquid desorbent present in the lower part of column 10 would flow upwardly through zone 68 and dilute the reflux stream. While a limited amount of flow in either direction through zone 68 can be permitted in my process without serious detriment, such flow is maintained essentially zero as described.

Gel adsorbent wet with occluded and/or adsorbed liquid desorbent and discharged via elevator 12 and chute 14 into the top of chamber 10, upon contacting upwardly flowing raffinate is caused to give up its adsorbed and/or occluded liquid and to accept raffinate in exchange therefor. In other words, raffinate upon initially contacting the wetted gel introduced into the top of chamber 10, displaces occluded and/or adsorbed desorbent liquid to provide a free liquid mixture of desorbent liquid and raffinate in an uppermost zone 81 of chamber 10. As I have pointed out hereinbefore, in accordance with conventional procedure the total raffinate is removed from the top of the reaction zone in admixture with the displaced desorbent and is necessarily recovered from the withdrawn stream, by additional means such as fractionation. However, as provided for by my invention, I withdraw as a relatively small proportion of the total liquids from the top of the adsorption column, a mixture of raffinate and desorbent liquid, and as a major proportion thereof raffinate in a high state of purity, from a subjacent zone, the former being recycled to the adsorption system without necessity of any fractionation and the latter recovered directly as a high purity raffinate product of the process. In carrying out this feature of my invention, passage of an excessive amount of raffinate from a lower portion of the adsorption zone into zone 81, and passage of desorbent liquid from zone 81 into a subjacent portion is prevented, by regulating the rate of withdrawal of raffinate from a subjacent zone 82 in chamber 10. The rate of withdrawal of raffinate from zone 82 is controlled so that it is at no time so high that desorbent is caused to flow from zone 81 downward through zone 82 and is preferably sufficiently low that unnecessary flow of raffinate from zone 82 upwardly to zone 81 is prevented. Regulation of the flow of raffinate from zone 82 can be carried out by any desired means either automatically or manually. A preferred means for regulating such raffinate flow comprises a motor valve 83 in raffinate withdrawal line 85 is response to flow controller 84, activated by float means 86 of a similar type to that of float 67 discussed hereinbefore. Float 86 is disposed in a body of liquid in chamber 10 intermediate zones 81 and 82 and is buoyed in response to a change in specific gravity in the liquid surrounding it. As in the case of float 67, float 86 is disposed in reservoir 87 having open ends 88 and 89 and associated with cover means 91 to prevent passage of gel therethrough. When liquid desorbent in chamber 10 is flowing in a direction from zone 81 into zone 82, the specific gravity of liquid in contact with float 86 is altered and float 86 is buoyantly moved to activate controller 84 to move valve 83 into an open or closed position as the case may be. For example, when the desorbent liquid is of a higher specific gravity than the raffinate, flow of desorbent liquid into zone 82 will cause float 86 to be buoyantly moved upwardly, in which case it is adapted to actuate controller 84 to close valve 83. Similarly if raffinate is passed from zone 82 into zone 81 at such a rate as to cause the specific gravity of the liquid buoying float 86 to fall below the predetermined value, float 86 is buoyantly lowered, actuating controller 84 to open valve 83. In a more specific instance, if the desorbent is normal octane and the raffinate normal hexane, the float is designed so as to float in normal hexane and the controller adjusted so as to hold the raffinate valve open when the float is in normal hexane. When the float is in the heavier normal octane, it is buoyed up with a greater force than the buoyant force in normal hexane, and this difference in buoyant forces is the basis for actuating the control 84. The float itself does not actually move through any great distance, but the composition of the liquid surrounding the float changes, thereby changing the density of the liquid surrounding the float. When employing floats 86 or 67, the selection of the float is made with respect to the predetermined specific gravity of liquid which surrounds it, and obviously such floats 86 or 67 are necessarily selected in consideration of any particular feed stock being fractionated in accordance with my invention. Means other than that specifically illustrated in Figure 1, for actuating valves 83 or 46, can be utilized. For example, as illustrated in Figure 2, a stream of liquid can be withdrawn from reservoir 87, through line 90, from a zone common to zones 81 and 82, and passed through analyzer means 101, adapted to operate valve 83 in response to any predetermined change in characteristics of the liquid passed therethrough. One such analyzer means particularly suitable for this purpose is a continuous infrared analyzer which can be adapted by one skilled in the art to continuously detect the composition of the liquid at a selected point in zone 82, or in a zone common to zones 81 and 82, and to actuate controller means 101 in response to any predetermined composition change to operate valve 83. Among other continuous analyzer means 101 that can be utilized, are included specific gravity indicators, refractive index indicators, and the like.

Liquid desorbent-raffinate is withdrawn from zone 81 through line 92 and returned in part, in contact with silica gel 11 through line 93 at a point intermediate the point of introduction of reflux through line 56 and the point of withdrawal of extract-desorbent liquid through line 44. Recycle of desorbent liquid in this manner helps to remove occluded material from the silica gel passing into the desorbing section in the bottom of the column, and takes the place of that portion of the reflux stream which would otherwise be required for the purpose. If desired, recycle of desorbent liquid withdrawn through line 92 can be dispensed with and additional reflux from line 56 utilized. A remaining portion, or all, as the case may be, of withdrawn liquid in line 92 is advantageously passed into the bottom of chamber 10 at a point below the introduction thereinto of hot desorbent liquid through line 38, in order to cool the wetted silica gel prior to introduction of same into chamber 10 for re-use. The temperature of hot desorbent liquid recovered as fractionation product (fractionator 48) is generally within the limits of 400 to 500° F. and is advantageously high since it is more efficient at such high temperatures in effecting desorption of aromatics from the gel.

In view of the fact that the basic physical principles underlying adsorption are now well known to the art, a detailed consideration of same will not be given here. Those skilled in the art will readily understand that the exact conditions to be employed, including temperatures and relative flow rates of adsorbent, feed, and reflux, desorbent, etc. will be greatly dependent on the particular feed stream which it is desired to separate, the degree of separation chosen, and the characteristics of the particular adsorbent used. Similarly, the residence time and temperature required for satisfactory desorption are dependent on the adsorbent, the character of the extract, and the character of the desorption operation.

The process described may be applied to a wide variety of feed stocks. In addition to the types mentioned specifically hereinabove, wide boiling range gasolines may be treated to effect separation of hydrocarbons merely by type rather than by individual chemical components, virgin or cracked gas oils may be treated to separate same into a highly aromatic extract suitable for feed in making furnace type carbon black such as "Philblack" and a highly paraffinic raffinate, suitable for catalytic cracking or use as a diesel fuel, kerosene or other naphtha fractions may be treated to remove aromatics and sulfur compounds therefrom. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce one or more relatively pure compounds or it may be used merely to concentrate further a desired compound in its original mixture.

Numerous non-hydrocarbons and particularly non-hydrocarbon organic liquid mixtures may be subjected to adsorption to separate same into group or individual constituents. The separation or fractionation of normally solid or normally gaseous organic compounds as well as the employment of normally solid or normally gaseous organic compounds as desorbing agent, especially those readily liquefied, are within the scope of this invention since they may be changed to liquids by appropriate coordination of two normal process variables, namely, temperature and pressure. For example, this process is readily adaptable to the fractionation of a normally gaseous butene-butadiene liquid mixture by slightly increasing operating pressures, with or without using decreased temperatures. Similarly it is within the scope or this process to purify a normally solid naphthalene stock by conducting the liquid adsorption-fractionation at a moderately elevated temperature. With respect to hydrocarbon types in general, polynuclear aromatics are most readily absorbed, mononuclear aromatics next, and continuing in accordance with decreasing adsorbability are the cyclic olefins, open-chain olefins, naphthenes, and paraffins. Ketones are more readily adsorbed than hydrocarbons, alcohols more than ketones, and water more than alcohols. The relative adsorbabilities of other liquids are already known to the art, or may be readily determined by trial. While certain specific materials have been described herein as the desorption liquid, various other liquids capable of effecting this are known to the art and may be used as determined by convenience or economics, taking into consideration effectiveness for desorbing a particular extract, cost, effect on adsorbent, and ease of removal from adsorbent.

While specific and preferred embodiments of the invention have been described herein, it will be appreciated that other variations may be made in the apparatus and process without departing from the spirit and scope of the invention.

The advantages of this invention are illustrated in the following example. The reactants and their proportions and their specific ingredients are presented as being typical and should not be construed to limit the invention unduly.

A selective adsorption system of the type described and illustrated with reference to Figure 1, employing silica gel of 14 to 20 mesh size as the downwardly moving mass of solid adsorbent, is utilized in recovering benzene and n-hexane, in high purity, from a mixture of n-hexane and benzene, the latter present in a concentration of about 3 weight percent. The extraction is conducted at about 90° F. Reflux, i. e., benzene recovered as described hereafter, is fed into the column near the midpoint at a volume ratio to fresh feed of about 4:1. De-aromatized kerosene as a desorbent is introduced into the chamber at a point near the bottom. Benzene-kerosene, as the extract desorbent-extract stream, is withdrawn from the chamber at a point intermediate the reflux inlet and the kerosene inlet. A stream of granular silica gel wet with kerosene is withdrawn from the bottom of the chamber and reintroduced into the adsorption chamber at the top, at a circulation rate of about 0.4 pound per pound of feed per hour. Gel discharged into the top of the chamber contains from about 60 percent of its weight of occluded and/or adsorbed kerosene.

Kerosene is desorbed or otherwise liberated from the wet gel entering the chamber, upon contacting the n-hexane raffinate. A resulting uppermost liquid zone of kerosene-n-hexane in the chamber, and a subjacent zone of n-hexane of high purity are maintained in the chamber and regulated by withdrawal of the n-hexane stream from the chamber in response to the specific gravity of a liquid body common to the two zones, in the manner described with reference to Figure 1.

The benzene-kerosene stream withdrawn from the chamber is fractionated to provide benzene of about 95 percent purity as an overhead product at about 110° F., a portion of which is returned to the chamber as the reflux above described. The remaining portion of the benzene over head product is recovered as a product of the process. Kettle product from that fractionation is recovered at about 450° F. and is recycled to the bottom of the adsorption chamber for re-use as the desorbent at that temperature.

About one-half of the n-hexane-kerosene stream at 90° F. withdrawn at the top of the chamber is introduced into the chamber to displace occluded benzene from the gel, at a point intermediate the reflux and desorbent liquid inlets, thus effecting some reflux without the aid of added benzene. The remaining portion of the withdrawn n-hexane-kerosene stream is introduced into the chamber at a point below the kerosene inlet, to cool the gel to about 100° F. before re-use of same.

I claim:

1. In a process for the separation of chemically unlike components in a liquid hydrocarbon mixture by the selective adsorption of one of said components on a solid adsorbent, wherein the liquid comprising the components to be separated is introduced into contact with a downwardly moving contiguous particulate column of said solid adsorbent, a liquid desorbent less readily adsorbed than the extract product of said process is contacted with said solid adsorbent containing components adsorbed from said hydrocarbon mixture to desorb said components therefrom, a resulting raffinate is passed upwardly through the zone of adsorption from an intermediate point therein, solid adsorbent wetted with desorbent liquid is withdrawn from a lowermost portion of said adsorption zone and returned to an uppermost portion thereof, and in said uppermost portion raffinate is contacted with said wetted adsorbent and displaces desorbent liquid therefrom to form a mixture of raffinate and liquid desorbent, the improvement comprising withdrawing a liquid stream from said raffinate-desorbent liquid mixture disposed in said uppermost zone, maintaining raffinate free from liquid desorbent in a zone subjacent said uppermost zone, withdrawing desorbent-free raffinate from said subjacent zone and regulating the flow of raffinate withdrawn from said subjacent zone at a rate such that there is substantially no downward flow of desorbent liquid displaced in said uppermost zone into said subjacent zone.

2. An adsorption process, for resolving a liquid mixture of components having different adsorbabilities into a raffinate comprising at least one component of relatively low adsorbability and an extract comprising at least one component of relatively high adsorbability by contact with a particulate solid adsorbent in an adsorption column and subsequent desorption of said extract by contact with a desorbent, which process comprises introducing adsorbent having desorbent adsorbed thereon into the upper section of the column, introducing feed into an intermediate section of the column and flowing said feed upwardly in the column countercurrent to the downwardly flowing adsorbent, whereby the adsorbable components are adsorbed and the unadsorbed components form a raffinate phase, flowing said raffinate phase upwardly in the column in sufficient quantity to displace desorbent from the adsorbent and prevent downward flow of displaced desorbent in the column, whereby a zone of raffinate uncontaminated with desorbent is formed in a section of the column between the points of adsorbent and feed introduction, removing a stream of a mixture of raffinate and desorbent from the column at a point above the uncontaminated raffinate section, and withdrawing a stream of uncontaminated raffinate from said last-mentioned section as a product of the process.

3. A process according to claim 2 wherein said raffinate comprises a paraffinic hydrocarbon and said extract comprises an aromatic hydrocarbon.

4. A process according to claim 2 wherein said raffinate comprises a paraffin and said extract comprises an olefin.

5. A process according to claim 2 wherein said raffinate comprises a butene and said extract comprises a butadiene.

6. A process according to claim 2 wherein said raffinate comprises normal hexane and said extract comprises benzene.

7. A process according to claim 2 wherein said extract comprises a polynuclear aromatic hydrocarbon.

8. A process according to claim 2 wherein said desorbent is introduced at the bottom of said column in sufficient quantity to desorb and displace adsorbed extract from said desorbent, a stream of desorbed extract is removed from said column at a point between the points of feed introduction and desorbent introduction, and at least part of said stream of a mixture of raffinate and desorbent removed from said column at said point above the uncontaminated raffinate section is returned to said column at a point between the points of feed introduction and extract stream removal.

9. An adsorption process which comprises introducing a particulate solid adsorbent having desorbent adsorbed thereon into the upper section of an adsorption column, introducing a liquid feed comprising at least one paraffinic hydrocarbon and at least one aromatic hydrocarbon into an intermediate section of the column and flowing said feed upwardly in the column countercurrent to the downwardly flowing adsorbent, whereby said aromatic hydrocarbon is adsorbed and the unadsorbed components form a raffinate phase enriched with respect to said paraffinic hydrocarbon; flowing said raffinate phase upwardly in said column in sufficient quantity to displace desorbent from the adsorbent and prevent downward flow of displaced desorbent in the column, whereby a zone of raffinate uncontaminated with desorbent is formed in a section of the column between the points of adsorbent and feed introduction; removing a stream of a mixture of paraffinic hydrocarbon and desorbent from the column at a point above the uncontaminated raffinate section; withdrawing a stream of said uncontaminated raffinate from said last-mentioned section as a product of the process; introducing a desorbent which is less strongly adsorbed than said aromatic hydrocarbon into a lower section of said column in sufficient quantity to desorb and displace said aromatic hydrocarbon and cause it to flow upwardly in the column; withdrawing a stream comprising said aromatic hydrocarbon from the column at a point between the points of feed and desorbent introduction and recovering said aromatic hydrocarbon as a product of the process; withdrawing adsorbent having desorbent adsorbed thereon from the bottom of said column; and introducing said desorbent into the upper section of said column as aforesaid.

10. A process according to claim 9 wherein said paraffinic hydrocarbon is normal hexane, said aromatic hydrocarbon is benzene, said desorbent is a kerosene, said column is maintained at a temperature in the range 70 to 110° F., said desorbent is introduced into said lower section at a temperature in the range 110 to 500° F., and a mixture of hexane and desorbent is withdrawn from said point above said uncontaminated raffinate section and contacted with adsorbent withdrawn from the bottom of said column, whereby said adsorbent is cooled.

11. Adsorption apparatus comprising, in combination: an elongated adsorption chamber; means for introducing a solid adsorbent into one end of said chamber, moving adsorbent longitudinally through said chamber, and withdrawing adsorbent from the opposite end of said chamber; means for withdrawing fluid from the end of said chamber adjacent the locus of introduction of said adsorbent; means for introducing feed into an intermediate part of said chamber; means for withdrawing raffinate from a part of said chamber intermediate the locus of feed introduction and said means for withdrawing fluid; reservoir means positioned with said chamber intermediate said means for withdrawing raffinate and the end of said chamber at which adsorbent is introduced; means responsive to fluid composition within said reservoir means and adapted to control the rate of flow through said means for withdrawing raffinate; and means for introducing fluid into said chamber adjacent said opposite end.

12. Adsorption apparatus comprising, in combination: a substantially vertical adsorption chamber; solids elevating means in open communication with said chamber through a solids conduit at the top and a solids conduit at the bottom of said chamber; fluid conduit means in open communication with an upper part of said chamber and with said solids conduit at the bottom of said chamber; feed conduit means in open communication with an intermediate part of said chamber; raffinate withdrawal means in open communication with said chamber at a point intermediate the top thereof and said feed conduit means; reflux conduit means in open communication with said chamber at a point intermediate said feed conduit means and the bottom of said chamber; fluid removal means in open communication with said chamber at a point intermediate said reflux conduit means and the bottom of said chamber; desorbent introduction means in open communication with said chamber at a point intermediate said fluid removal means and the bottom of said chamber; fluid reservoir means positioned within said chamber intermediate the top of said chamber and said raffinate withdrawal means; fluid reservoir means positioned within said chamber intermediate said reflux conduit means and said desorbent introduction means, each of said reservoir means being covered at the top and open at the bottom, valve means connected with said raffinate withdrawal means, means responsive to liquid composition within said first-mentioned reservoir means and adapted to regulate said valve means, valve means connected with said fluid removal means, and means responsive to liquid composition within said latter-mentioned reservoir means and adapted to control said latter-mentioned valve means.

13. Apparatus according to claim 12 wherein said means responsive to liquid composition are float means.

14. Apparatus according to claim 12 wherein said means responsive to liquid composition are infrared analyzer means.

15. Apparatus according to claim 12 wherein said means responsive to liquid composition are specific gravity indicators.

16. Apparatus according to claim 12 wherein said means responsive to liquid composition are refractive index indicators.

References Cited in the file of this patent

UNITED STATES PATENTS

| | | |
|---|---|---|
| 2,470,339 | Claussen et al. | May 17, 1949 |
| 2,582,415 | Claussen | Jan. 15, 1952 |
| 2,585,490 | Olsen | Feb. 12, 1952 |
| 2,644,018 | Harper | June 30, 1953 |
| 2,696,305 | Slover | Dec. 7, 1954 |
| 2,696,510 | Weedman | Dec. 7, 1954 |